Dec. 14, 1965     E. D. HENZE ETAL     3,223,766
BASE FILM OSCILLATION
Filed Sept. 17, 1962     4 Sheets-Sheet 1

EDWARD D. HENZE
EDWARD W. FORMAN, JR.
INVENTOR.

BY E. J. Berry

Dec. 14, 1965   E. D. HENZE ETAL   3,223,766
BASE FILM OSCILLATION
Filed Sept. 17, 1962   4 Sheets-Sheet 2
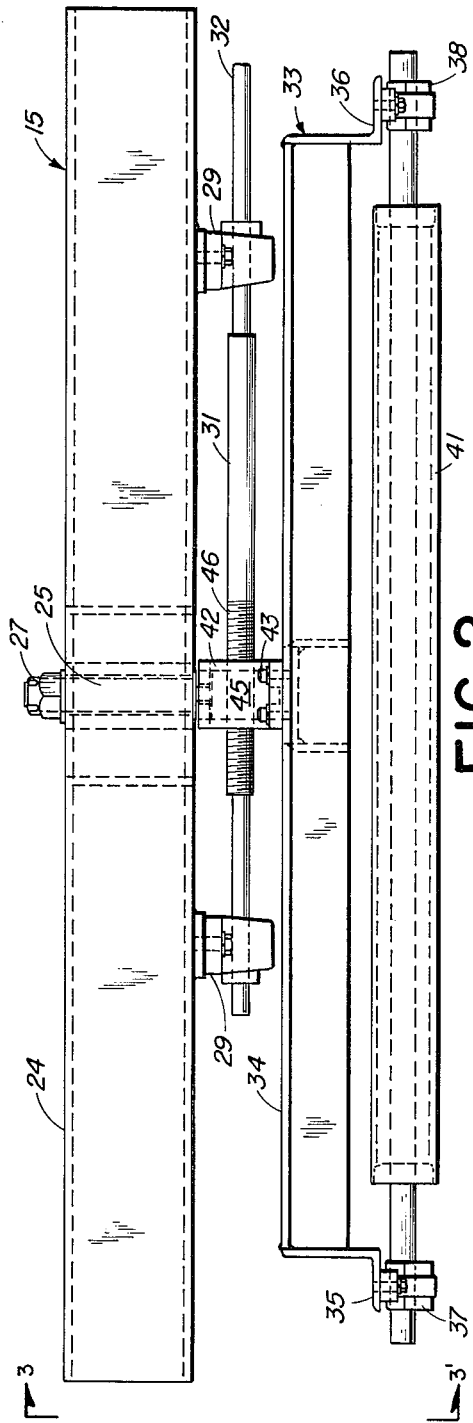
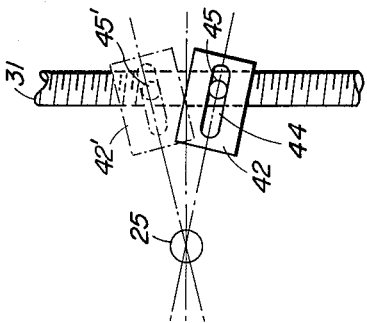
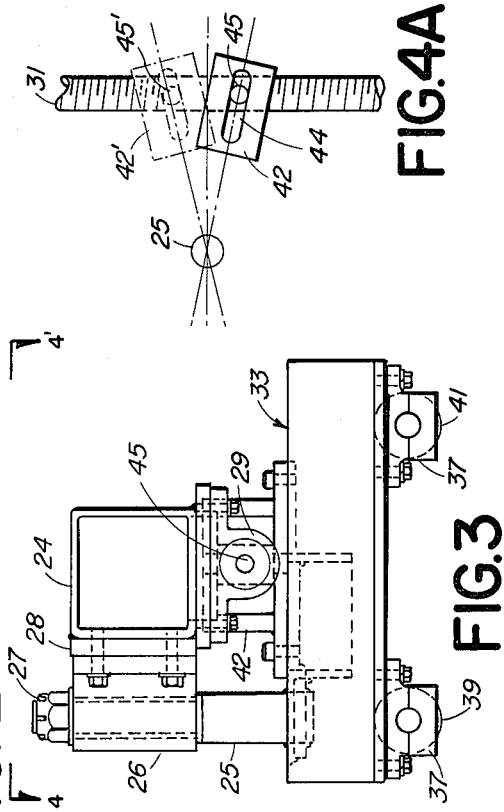
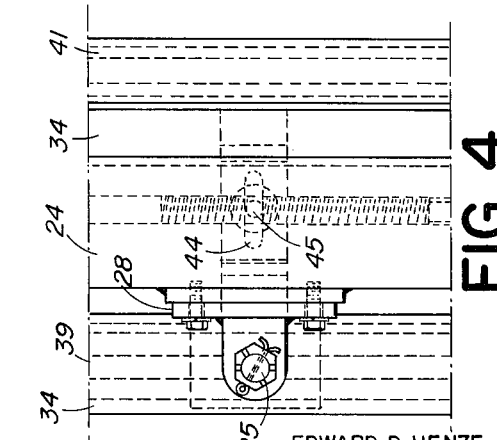
EDWARD D. HENZE
EDWARD W. FORMAN, JR.
INVENTOR.
BY E. J. Berry

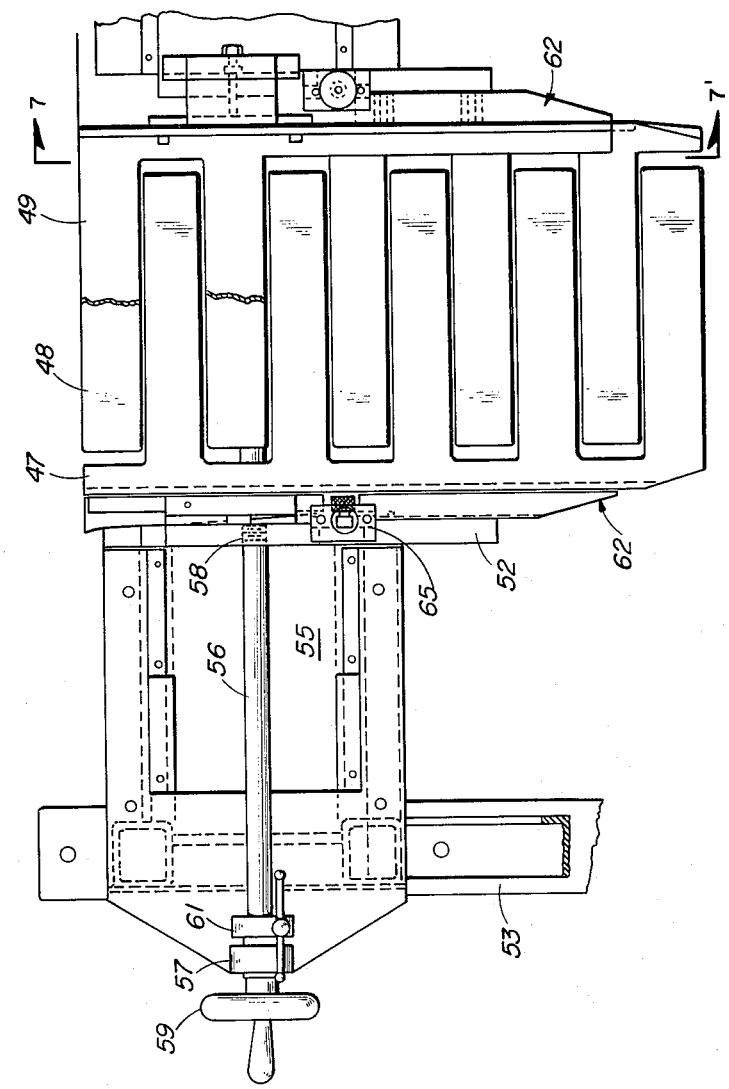

Dec. 14, 1965   E. D. HENZE ETAL   3,223,766
BASE FILM OSCILLATION
Filed Sept. 17, 1962   4 Sheets-Sheet 4
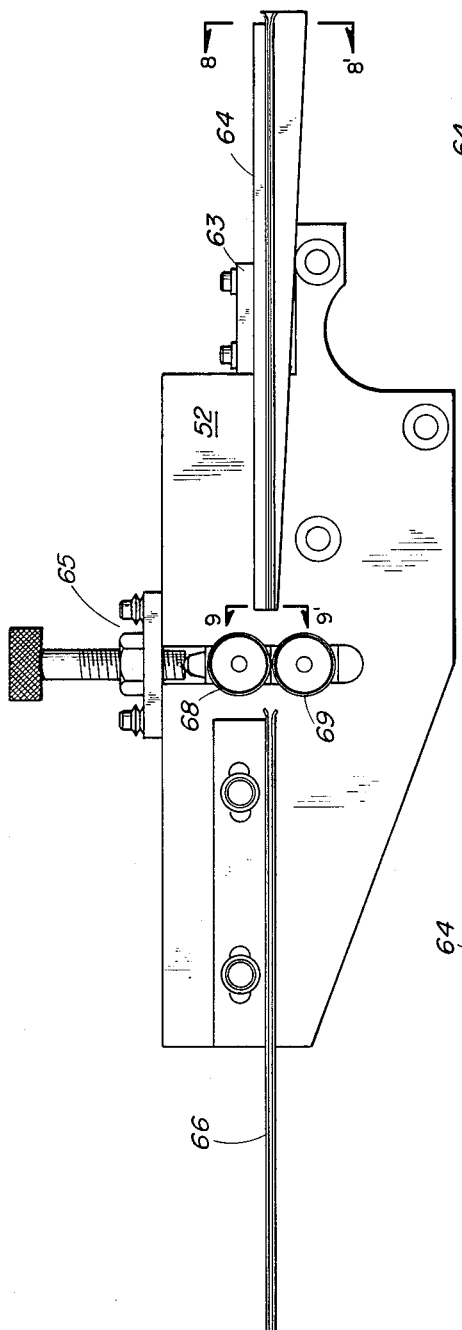
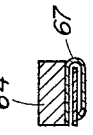
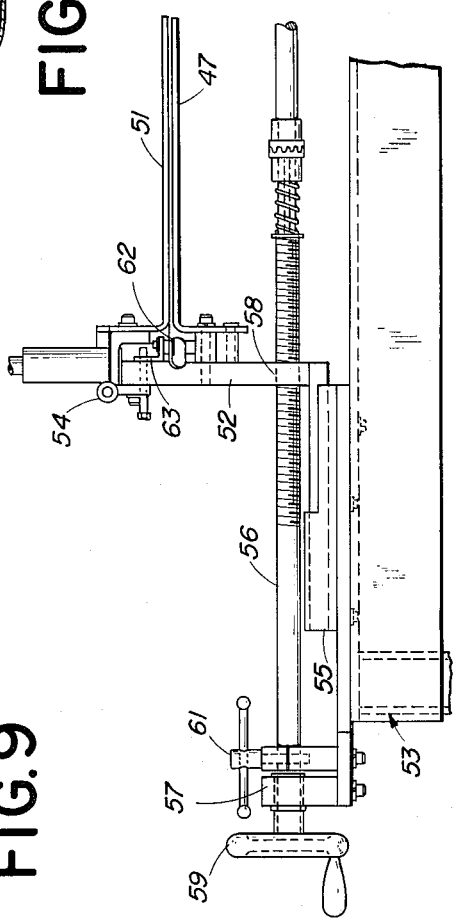
EDWARD D. HENZE
EDWARD W. FORMAN, JR.
INVENTOR.
BY E. J. Berry _United States Patent Office_

3,223,766
Patented Dec. 14, 1965

3,223,766
BASE FILM OSCILLATION
Edward D. Henze, Pittsford, and Edward W. Forman, Jr., Palmyra, N.Y., assignors to National Distillers and Chemical Corporation, New York, N.Y., a corporation of Virginia
Filed Sept. 17, 1962, Ser. No. 223,933
9 Claims. (Cl. 264—288)

This invention relates to an improved method and apparatus for producing transversely oriented thermoplastic sheets and webs. More particularly, the invention relates to a method and apparatus for producing random variation in the gauge profile of such sheet materials upon transverse orientation thereof by stretching in a tenter frame.

It is known to stretch thermoplastic sheet material transversely or laterally by passing the same through a so-called textile-type tenter frame. One process by which a plastic film, preferably a polypropylene film, can be so oriented is disclosed in co-pending application Serial No. 155,446, entitled "Orientation Process" filed on November 28, 1961 and assigned to the assignee of the present invention.

The aforesaid application discloses stretching a continuous web of polypropylene film within a tenter frame, the entire length of which is provided with parallel chains carrying a continuous succession of clamps or clips for gripping and moving the polypropylene web through the transverse stretching process. The polypropylene film is directed between the parallel rows of tenter clips, which grip the edges of the previously longitudinally stretched film and move outwardly as the chains progress through the tenter frame, to stretch the film transversely. At the end of the frame, the clips are released and returned by the frame to the leading end of the tenter frame for further engagement with the polypropylene film fed thereto.

When an extruded thermoplastic sheet material such as polypropylene is thus transversely oriented by stretching in a tenter frame, small variations in the gauge profile of the sheet material tend to be accentuated. The thinner sections of the plastic sheet material stretch more easily (and therefore stretch more) than the thicker sections. In this manner, the relative gauge variation of the plastic film is considerably amplified after passage through the tenter frame.

The longitudinal gauge bands produced by known tentering procedures render it difficult to wind finished rolls having satisfactory shapes for subsequent handling. Moreover, the presence of such gauge bands permits localized stretching of the oriented plastic film; in the case of oriented polypropylene film, the formation of stretched bands in this manner has substantially impaired utilization of such film for metallizing, laminating, etc.

It is not generally possible to eliminate or randomize gauge variations by adjustment of the extrusion die. In order to decrease such gauge variations prior workers have attempted to employ deckling devices on the extrusion die or other means for oscillating the plastic film relative to the extrusion die or the windup of the finished roll. These procedures are difficult to perform mechanically and require relatively large movements of the plastic sheet material to be effective.

It is among the objects of the present invention to provide a method for producing random variations in the gauge profile of thermoplastic sheet material, particularly polypropylene film, while transversely orienting such material within a tenter frame.

Another object of this invention is to provide an apparatus useful in the practice of such method which is relatively simply constructed and economical in operation.

A further object of the invention is to provide such an apparatus which facilitates the lateral orientation, within a tenter frame, of plastic sheet material having a trimmed edge.

Other objects and advantages of this invention will be apparent from consideration of the following detailed description thereof.

In accordance with the invention a method is provided for producing random variations in the gauge profile of a thermoplastic sheet material, preferably a polypropylene film, while transversely orienting such sheet material, including the steps of feeding the sheet material longitudinally through a tenter frame and, prior to or during initial passage of the sheet material through the tenter frame, laterally oscillating the sheet material and the tenter frame relative to one another. The relative lateral oscillation produced between the sheet material and the tenter frame permits the tenter clips to engage the sheet material in a manner such as to stretch slightly differing portions of the film in a random manner with a corresponding, though much greater, random movement of the gauge bands in the stretched film.

Surprisingly, it has been found that a relatively slight oscillation created during the initial transverse stretching of the thermoplastic sheet material in the tenter frame results in a random movement of the gauge bands of the material over a span which is out of all proportion to the degree of transverse stretching to which the sheet material is subjected. With a relatively small degree of oscillation the gauge bands of the thermoplastic sheet material are thus distributed in a random fashion across the width of the film, increasing the yield of so-called flat film, which can be readily wound in rolls of substantially uniform geometric shape, and which can be employed for metallizing, laminating or like purposes. In one illustration of this unexpected result, it was found that when a polypropylene film was subjected to a ⅞ inch transverse oscillation and thereafter passed through a tenter frame having a stretch ratio of 8:1, a random movement of the gauge bands was produced over a 12 to 15 inch span, almost twice the proportional transverse movement of the film.

The apparatus of the invention includes a feed means for longitudinally feeding the thermoplastic sheet material toward and into a tenter frame and a mechanism for laterally oscillating the sheet material and the tenter frame relative to one another at or prior to the initial stage of transverse orientation of the sheet material in the frame. The lateral oscillation of the sheet material relative to the tenter frame may be effected by feeding the material through the tenter frame and moving the tenter frame clips back and forth, thereby gripping the sheet material at different points. While this procedure results in a random distribution of gauge bands across the sheet material as it emerges from the tenter frame, it is limited by the inability of the tenter clips to grasp large quantities of the sheet material behind the clip shoes. Hence, in accordance with a preferred embodiment of the invention, an apparatus is provided including a mechanism for laterally oscillating the thermoplastic sheet material prior to its entry into the tenter frame, cutting members for trimming the lateral edges of the sheet material to thereby remove the relatively thick beads formed on such edges by the extrusion forming of the sheet material, and edge folders for folding the edges of the trimmed sheet to permit the tenter frame clips to properly grasp the trimmed edges and feed the sheet material through the tenter frame to effect transverse orientation thereof.

For a fuller understanding of the nature and objects of the present invention, reference is made to the following detailed description of a preferred embodiment thereof involving the transverse orientation of a polypropylene film; it will of course be understood that the invention is applicable to the treatment of other thermoplastic materials including cellulose esters, polyvinyl derivatives, polyesters and other polyolefin films, e.g., polyethylene.

In the accompanying drawings:

FIGURE 2 is a front elevation of the oscillating mechanism of the device of FIGURE 1, taken in the direction of the line 2—2' in FIGURE 1;

FIGURE 3 is a side elevation of the oscillating mechanism, taken along the line 3—3' in FIGURE 2;

Figure 1:
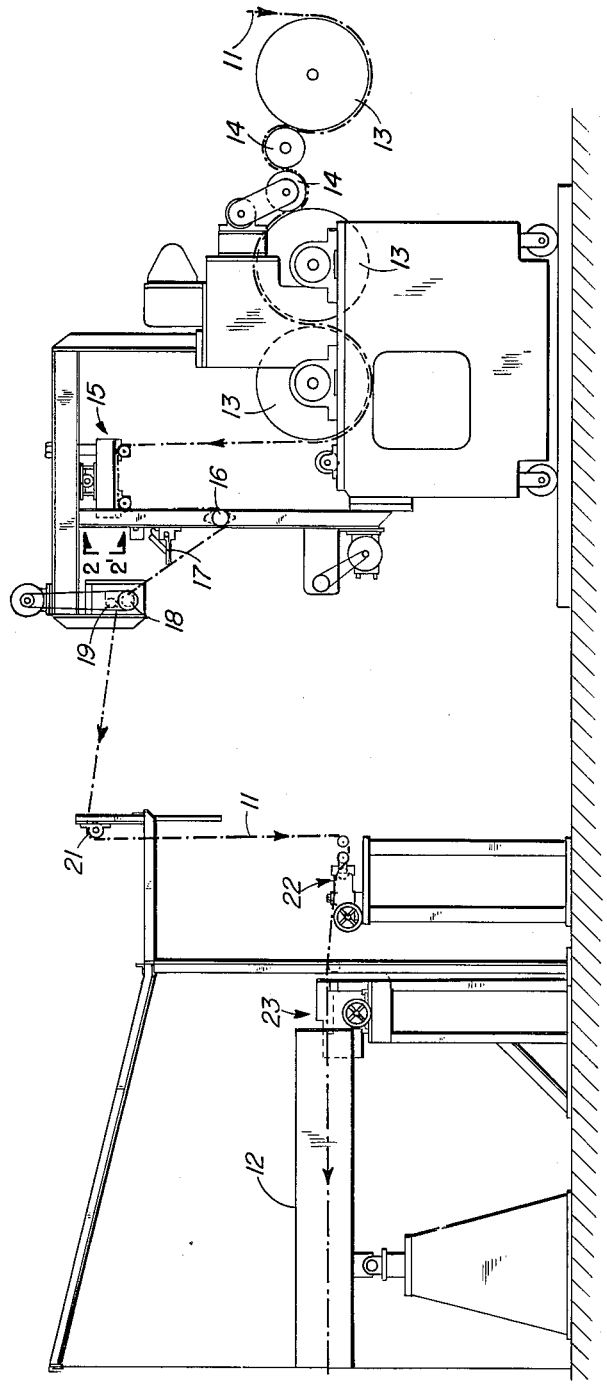
FIGURE 1 is a schematic side elevation of the preferred equipment for oscillating and feeding a polypropylene film into a tenter frame in accordance with the invention.

FIGURE 4 is a partial plan view taken along the line 4—4' in FIGURE 3, showing the pivot shaft about which the oscillating roll mounting frame of the oscillating mechanism pivots and the drive pivot which effects lateral oscillation of the mounting frame; FIGURE 4A is a schematic plan view illustrating the relative positions of the pivot shaft and the laterally movable drive pivot during oscillation of the oscillating roll mounting frame;

FIGURE 5 is a partial plan view of the film feed-in table upon which the polypropylene film is fed to the tenter frame;

FIGURE 6 is a partial end elevation of the film feed-in table, showing the film guide mechanism thereof;

FIGURE 7 is a side elevation taken along the line 7—7' in FIGURE 5, showing one of the edge folders mounted lengthwise of the feed-in table for folding the edges of the polypropylene film as it is fed toward the tenter frame;

FIGURE 8 is a vertical section taken adjacent one end of the edge folder shown in FIGURE 7, through the line 8—8' thereof; and FIGURE 9 is a vertical section taken through the line 9—9' in FIGURE 7, showing a cross section of the forming member of the edge folder adjacent its delivery end.

Referring to the drawings, FIGURE 1 illustrates the layout of a preferred embodiment of the oscillating and feed-in equipment for delivering a polypropylene film 11, fed in the direction of the arrows shown in FIGURE 1, to a tenter frame, indicated generally at 12 in FIGURE 1. The equipment shown includes a number of feed and idler rolls 13 and 14, respectively, about which the polypropylene film is fed. An oscillating mechanism, indicated generally at 15, is positioned adjacent the last feed roll 13, for receiving the longitudinally fed film 11 and effecting lateral oscillation thereof.

An idler roll 16 receives the polypropylene film 11 after passage through the oscillating mechanism 15 and directs the moving film past a pair of edge trimmers 17. The trimmers 17 trim the lateral edges from the polypropylene film.

A pair of nip rolls 18 and 19, an idler roll 21 and a conventional Mount Hope edge guide, indicated generally at 22, direct the moving web of polypropylene film to a feed-in table 23, which in turn delivers the film to the tenter frame 12.

As will be described more fully hereinafter, the feed-in table 23 includes guide members for aligning films of varying widths and a pair of edge folders for folding the laterally trimmed edges of the film to facilitate the grasp thereof by the tenter frame clips during the subsequent transverse orientation of the film.

It will be understood that the tenter frame 12, which is indicated schematically in FIGURE 1, may include one or more oven zones and both longitudinal and transverse stretching sections, in order to effect biaxial orientation of the polypropylene film fed thereto, as more fully described in the aforesaid co-pending application Serial No. 155,446.

*Oscillating mechanism 15*

The oscillating mechanism indicated at 15 in FIGURE 1 is shown in detail in FIGURES 2 to 4 of the drawings. Such mechanism includes a fixed mounting bar 24 secured to supporting side frames, not shown in the drawings. Adjacent the mounting bar 24 a pivot shaft 25 is mounted within a bearing 26, held therein by a lock nut 27; the bearing 26 is fastened to a mounting plate 28 which is secured in turn to the bar 24 (see FIGURE 3).

Mounted in depending relation from the mounting bar 24, along the length thereof, are a pair of pillow blocks 29 providing bearings for a drive shaft 31 utilized to produce the desired oscillation of the mechanism. The drive shaft is driven from one end 32 thereof by a suitable drive, e.g., a motor driven chain or belt drive.

An oscillating roll mounting frame, indicated generally at 33, is pivotally supported by the pivot shaft 25 and laterally oscillated by means associated with the drive shaft 31 journaled for rotation in bearings secured to the stationary mounting bar 24. The roll mounting frame 33 includes a pair of cross pieces 34 having flanged end plates 35 and 36 extending transversely thereof. The end plates 35 and 36 support pairs of spaced pillow blocks 37 and 38, respectively, within which are journaled oscillating rolls 39 and 41.

As best shown in FIGURE 2, a drive pivot housing 42 is secured to the cross pieces 34 of the roll mounting frame 33 intermediate their ends by means of screws 43. The housing includes a top plate and a base plate, each of which has a slot 44 extending therethrough. A drive pivot 45, having pin-like end projections extending into the slots 44 in the top and base plates of the pivot housing 42 and a centrally threaded bore, is received within the pivot housing. The bore of the drive pivot 45 is threadedly engaged by a threaded intermediate portion 46 of the drive shaft 31 for effecting oscillation of the drive pivot and the roll mounting frame 33 secured thereto.

Upon actuating the drive shaft 31, the threaded portion 46 thereof effects lateral movement of the drive pivot 45. Lateral movement of the pivot 45 within the drive pivot housing 42 tends to effect a similar lateral displacement of the roll mounting frame 33, secured by screws 43 to the housing 42. However, since the roll mounting frame 33 is pivotally secured to the pivot shaft 25 the lateral force exerted upon the pivot housing 42 tends to produce an arcuate movement of the roll mounting frame 33 about the pivot 25.

As shown in FIGURE 4A, upon lateral displacement of the drive pivot 45 from the position shown in full line to the position shown in broken line at 45', lengthwise of the drive shaft 31, the pivot housing 42, which is constrained by screws 43 to pivot with the roll mounting frame 33 about the pivot shaft 25, moves longitudinally inward with respect to the pivot 45 (the slots 44 in the pivot housing top and base plates slide with respect to the longitudinally fixed pivot 45). In this manner lateral movement of the drive pivot 45 effects an arcuate oscillating movement of the roll mounting frame 33 without exerting distorting forces upon the drive pivot 45 or the drive shaft 31 engaged therewith.

The arcuate oscillating movement of the roll mounting frame 33 thus provided produces a primary lateral oscillation of the polypropylene film fed over the oscillating rolls 39 and 41. Unexpectedly, when such an oscillating movement having a lateral component is thus impressed upon the longitudinally fed sheet material, random variations in the gauge profile are produced in an optimum manner.

The trimmer 17 (FIGURE 1), as noted above, removes the lateral edges of the polypropylene film upon which relatively thick beads are formed upon extrusion thereof. The film is thereafter fed to the feed-in table 23 whereat the trimmed edges are folded to facilitate their subsequent engagement by the tenter frame clips during transverse orientation of the film.

*Feed-in table 23*

The feed-in table and the associated edge folder mechanism is shown in FIGURES 5 to 9 of the drawings. The feed-in table includes a series of intermeshing lower film guides or fingers 47 and 48 and a series of intermeshing upper film guides or fingers 49 and 51, spaced sufficiently from one another to hold the polypropylene film flat as it is fed therebetween.

The horizontally disposed upper and lower film guides are supported by vertical mounting plates 52 extending lengthwise of the supporting frame 53 of the table 23; as shown in FIGURE 6, where the mounting plate 52 on one side of the table is shown by way of illustration, the adjacent upper film guide 51 includes a vertical flange which is hinged at 54 to the mounting plate 52 in order to raise the film guide to permit threading the polypropylene film in the guideway defined between the upper and lower guide fingers.

While the construction of the mounting plate 52 and the associated guide mechanism adjacent one side only of the feed-in table 23 is described below, it will be understood that similar guide members are provided on the opposite side of the feed-in table.

The mounting plate 52 is mounted for sliding movement transversely of the direction of travel of the polypropylene film in an elongated slot of a guide member 55. A threaded adjusting shaft 56, mounted in bearings 57 on the supporting frame 53 of the table, engages a bore 58 in the mounting plate 52; a hand wheel 59 is provided on the shaft 56 to facilitate adjusting the position of the mounting plate 52 and the associated edge folder, described hereinafter, relative to the lateral edges of the polypropylene film, to thereby adapt the apparatus for handling films of varying widths. Additionally mounted on the adjusting shaft 56 is a shaft clamp 61 which locks the shaft, the mounting plate 52 and the associated guide members in any desired position.

A pair of edge folders, indicated generally at 62 in FIGURE 5, are mounted on the mounting plates 52 at the lateral edges of the feed-in table 23. Each edge folder is supported by a bracket 63 (FIGURES 6, 7) secured to mounting plate 52 and includes an elongated formed metal quill 64 designed to turn the edge of the polypropylene film as it is fed therethrough, a nip roll assembly 65 for creasing the folded edge of the film thus formed, and an elongated guide member 66 for directing the folded edge into the moving tenter clips of the tenter frame 12.

As the polypropylene film is fed lengthwise of the feed-in table, the lateral edges thereof are received within the tapering envelopes 67 of the quill shaped members 64; as shown in FIGURES 8 and 9, as the film is moved from an initial position adjacent line 8—8′ in FIGURE 7, to a second position adjacent line 9—9′ in FIGURE 7, the lateral edges are gradually turned inwardly by the envelopes 67 to form folded edges adjacent the delivery ends of the quill members. Upon passing the film between the nip rolls 68 and 69 of the nip roll assembly 65, the fold is creased and the film is then guided into the tenter frame for engagement with the tenter frame clips.

In operation, the polypropylene film 11, after being fed over the feed and idler rolls 13 and 14, respectively, is fed over the pair of oscillating rolls 39 and 41 of the oscillating mechanism 15. As noted above, when the drive shaft 31 of such mechanism is actuated the drive pivot 45 is laterally displaced, effecting an arcuate movement of the drive pivot housing 42 and the oscillating roll mounting frame 33 about the pivot shaft 25. The polypropylene film is thus subjected to oscillation having a primary lateral force component. This wave-like motion tends to distribute the gauge bands over the entire width of the film in a random manner, while requiring a total oscillation of no more than about 1 inch for a film width of about 12 to 15 inches.

The lateral edges of the film are then sheared by the fixed trimmers 17. Subsequently, after being fed between the nip rolls 18 and 19, over idler 21 and the edge guide 22, the film is fed to the feed-in table 23, the mounting plates 52 and associated guide mechanism of which have previously been adjusted to receive the film width. The film is passed between the edge folders 62 and the lateral edges thereof are folded preliminary to engagement by the tenter frame clips of the tenter frame 12.

Hence the present invention provides an efficient method and apparatus for producing random variations in the gauge profile of a thermoplastic sheet material which is transversely oriented or stretched within a tenter frame, by laterally oscillating the film relative to the tenter frame. Since certain changes may be made in the apparatus and method described hereinabove without departing from the scope of the present invention, it is intended that all matter contained in the above description shall be interpreted as illustrative and not in a limiting sense.

What is claimed is:

1. A method for producing random variations in the gauge profile of a continuous thermoplastic sheet material while transversely orienting said sheet material, comprising feeding the sheet material longitudinally through a tenter frame and effecting oscillatory motion between the sheet material and the tenter frame to produce a transversely oriented sheet material having a random distribution of longitudinal gauge bands throughout the width thereof.

2. A method for randomizing variation inherent in the gauge profile of a continuously produced thermoplastic sheet material while transversely orienting said material, comprising longitudinally feeding the sheet material toward a tenter frame, laterally oscillating said material prior to its entry into the tenter frame, trimming the lateral edges of the oscillated sheet material, folding the lateral edges of the thus trimmed sheet material to permit the tenter frame clips to grasp the same and feeding the sheet material through the tenter frame to produce a transversely oriented sheet material having a random distribution of longitudinal gauge bands throughout the width thereof.

3. The method as defined in claim 2, in which said thermoplastic sheet material is a polypropylene film.

4. A method for randomizing variation inherent in the gauge profile of a continuously produced polypropylene film while transversely stretching said film, comprising feeding the polypropylene film longitudinally toward a tenter frame and, prior to passage of said film through the tenter frame, subjecting the film to an oscillating force having a primary lateral component to thereby produce a random distribution of longitudinal gauge bands in the polypropylene film, and thereafter feeding said film through the tenter frame and transversely stretching the film to produce a transversely oriented polypropylene film having a random distribution of gauge bands throughout the width thereof.

5. An apparatus for randomizing variation inherent in the gauge profile of a continuously produced thermoplastic sheet material, including a tenter frame, means for longitudinally feeding said sheet material toward and into said tenter frame and means for laterally oscillating the sheet material and the tenter frame relative to one another during the initial stage of transverse orientation of the sheet material in the tenter frame.

6. An apparatus for randomizing variation inherent in the gauge profile of a continuously produced thermoplastic sheet material, comprising a tenter frame, means for longitudinally feeding the sheet material toward and into said tenter frame, means for laterally oscillating the sheet material prior to its entry into the tenter frame, cutting members for trimming the lateral edges of the sheet material to thereby remove the beads formed thereon, and edge folders for folding the edges of the trimmed sheet to permit the tenter frame clips to grasp the trimmed edges and thereby facilitate feeding the sheet material through the tenter frame to effect transverse orientation thereof.

7. The apparatus of claim 6, in which said oscillating means includes at least one oscillating roll, a fixed point about which said roll is adapted to pivot, a laterally displaceable drive member for oscillating said roll and linkage means between said drive member and said roll permitting oscillation of said roll about said fixed point with a primary lateral movement produced by said drive member, to thereby subject said sheet material to an arcuate oscillating force extending primarily laterally of the direction of travel of said sheet material.

8. The apparatus of claim 6, in which said edge folders include forming members of decreasing cross sections for receiving the lateral edges of said sheet material and affecting folding thereof as the sheet material is fed therethrough, pressure means for creasing the folded lateral edges of the sheet material formed by said forming members, and guiding means for guiding the folded lateral edges of said sheet material into engagement with the tenter frame clips of said tenter frame to facilitate transverse orientation of said sheet material.

9. An oscillating mechanism for laterally oscillating a thermoplastic sheet material fed in a longitudinal direction to thereby produce random variations in the gauge profile of said sheet material, said oscillating mechanism including a stationary support, a pivot shaft secured to said support, a drive shaft journaled for rotation on said support, a drive pivot mounted on said drive shaft and movable longitudinally thereof, an oscillatable frame pivoted to said pivot shaft, and a drive pivot housing receiving said drive pivot and secured to said oscillatable frame, said pivot housing including slotted base and top plates permitting lateral oscillation of said drive pivot and arcuate oscillation of said pivot housing and the oscillatable frame secured thereto about said pivot shaft, said mechanism thereby providing an oscillating force acting on said longitudinally fed sheet material having a primary lateral force component.

No reference cited.

ALEXANDER H. BRODMERKEL, *Primary Examiner.*

C. B. HAMBURG, F. S. WHISENHUNT,
*Assistant Examiners.*